(12) United States Patent
Glen

(10) Patent No.: US 9,473,678 B2
(45) Date of Patent: Oct. 18, 2016

(54) METHOD, APPARATUS AND MACHINE-READABLE MEDIUM FOR APPORTIONING VIDEO PROCESSING BETWEEN A VIDEO SOURCE DEVICE AND A VIDEO SINK DEVICE

(71) Applicant: ATI Technologies ULC, Markham, Ontario (CA)

(72) Inventor: David I. J. Glen, Toronto (CA)

(73) Assignee: ATI Technologies ULC, Markham, Ontario (CA)

(*) Notice: Subject to any disclaimer, the term of this patent is extended or adjusted under 35 U.S.C. 154(b) by 0 days.

(21) Appl. No.: 14/518,919

(22) Filed: Oct. 20, 2014

(65) Prior Publication Data

US 2015/0036052 A1 Feb. 5, 2015

Related U.S. Application Data

(63) Continuation of application No. 11/957,938, filed on Dec. 17, 2007, now Pat. No. 8,866,971.

(51) Int. Cl.
*H04N 5/21* (2006.01)
*G09G 5/00* (2006.01)
(Continued)

(52) U.S. Cl.
CPC ............... *H04N 5/21* (2013.01); *G09G 5/006* (2013.01); *H04N 5/14* (2013.01); *H04N 21/4113* (2013.01); *H04N 21/436* (2013.01);
(Continued)

(58) Field of Classification Search
CPC ............ G09G 2350/00; G09G 2370/047; G09G 2370/10; G09G 2370/12; G09G 5/006; H04N 21/4113; H04N 21/436; H04N 5/14; H04N 5/21
See application file for complete search history.

(56) References Cited

U.S. PATENT DOCUMENTS 4,792,974 A 12/1988 Chance
5,852,472 A 12/1998 Prasad et al.
(Continued)

FOREIGN PATENT DOCUMENTS

CN 1815606 A 8/2006
EP 0590837 A2 4/1994
(Continued)

OTHER PUBLICATIONS

HDMI licensing LLC, High-Definition Multimedia Interface Specification version 1.3a, Nov. 10, 2006, HDMI Licensing LLC, Ver 1.3a, p. 118-126.*
(Continued)

*Primary Examiner* — Rong Le
(74) *Attorney, Agent, or Firm* — Faegre Baker Daniels LLP

(57) ABSTRACT

To apportion desired video processing between a video source device and a video sink device, at one of the devices, and based upon an indication of video processing algorithms of which the other device is capable and an indication of video processing algorithms of which the one device is capable, a set of video processing algorithms for achieving desired video processing is identified. The identified set of video processing algorithms is classified into a first subset of algorithms for performance by the other device and a second subset of algorithms for performance by the one device. At least one command for causing the other device to effect the first subset of video processing algorithms is sent. The one device may be configured to effect the second subset of algorithms.

24 Claims, 10 Drawing Sheets

(51) Int. Cl.
*H04N 5/14* (2006.01)
*H04N 21/41* (2011.01)
*H04N 21/436* (2011.01)

(52) U.S. Cl.
CPC ... *G09G 2350/00* (2013.01); *G09G 2370/047* (2013.01); *G09G 2370/10* (2013.01); *G09G 2370/12* (2013.01)

(56) References Cited

U.S. PATENT DOCUMENTS

| | | | |
|---|---|---|---|
| 5,960,081 | A | 9/1999 | Vynne et al. |
| 6,314,479 | B1 | 11/2001 | Frederick et al. |
| 6,463,445 | B1 | 10/2002 | Suzuki et al. |
| 6,484,128 | B1 | 11/2002 | Sekiya |
| 6,609,251 | B1 | 8/2003 | Yoneda |
| 7,079,128 | B2 * | 7/2006 | Kim ............. G09G 1/167 345/213 |
| 7,216,177 | B1 | 5/2007 | Strong et al. |
| 7,256,835 | B2 | 8/2007 | Jiang et al. |
| 7,349,029 | B1 | 3/2008 | Chou |
| 7,355,531 | B2 | 4/2008 | Lai et al. |
| 7,382,364 | B2 | 6/2008 | Sasaki |
| 7,542,618 | B2 | 6/2009 | Kang et al. |
| 7,548,675 | B2 | 6/2009 | Tatum et al. |
| 7,734,143 | B2 | 6/2010 | Mizuhashi et al. |
| 7,929,525 | B2 | 4/2011 | Winter et al. |
| 7,954,131 | B2 | 5/2011 | Cholas et al. |
| 8,117,620 | B2 | 2/2012 | Raghunath et al. |
| 2001/0019365 | A1 | 9/2001 | Kim et al. |
| 2002/0156870 | A1 | 10/2002 | Boroumand et al. |
| 2002/0161844 | A1 | 10/2002 | Overtoom |
| 2003/0191623 | A1 | 10/2003 | Salmonsen |
| 2004/0085283 | A1 * | 5/2004 | Wang ............. G09G 5/005 345/100 |
| 2004/0194132 | A1 | 9/2004 | Kawashima et al. |
| 2004/0218599 | A1 | 11/2004 | Kobayashi |
| 2005/0259751 | A1 | 11/2005 | Howard et al. |
| 2005/0270415 | A1 | 12/2005 | Jiang et al. |
| 2006/0056629 | A1 | 3/2006 | Adamson et al. |
| 2006/0066504 | A1 | 3/2006 | Sampsell et al. |
| 2006/0067690 | A1 | 3/2006 | Tatum et al. |
| 2006/0077778 | A1 | 4/2006 | Tatum et al. |
| 2006/0140499 | A1 | 6/2006 | Kang et al. |
| 2006/0182422 | A1 | 8/2006 | Peng |
| 2006/0184992 | A1 | 8/2006 | Kortum et al. |
| 2006/0269056 | A1 | 11/2006 | Montag |
| 2007/0058077 | A1 | 3/2007 | Hirai |
| 2007/0186015 | A1 * | 8/2007 | Taft ............. G09G 5/006 710/16 |
| 2007/0201492 | A1 * | 8/2007 | Kobayashi ............. G06F 3/14 370/395.64 |
| 2007/0230578 | A1 | 10/2007 | Shi et al. |
| 2007/0268164 | A1 | 11/2007 | Lai et al. |
| 2007/0286246 | A1 | 12/2007 | Kobayashi |
| 2008/0072261 | A1 | 3/2008 | Ralston et al. |
| 2008/0201748 | A1 | 8/2008 | Hasek et al. |
| 2009/0031381 | A1 | 1/2009 | Cohen et al. |
| 2009/0046205 | A1 * | 2/2009 | Strasser ............. H04N 5/63 348/634 |
| 2009/0046993 | A1 | 2/2009 | Nishio |
| 2010/0142723 | A1 | 6/2010 | Bucklen |
| 2010/0296558 | A1 | 11/2010 | Matsushita et al. |
| 2011/0026779 | A1 | 2/2011 | Matsumoto et al. |

FOREIGN PATENT DOCUMENTS

| | | |
|---|---|---|
| EP | 1328125 | 7/2003 |
| EP | 1675382 A2 | 6/2006 |
| EP | 1677249 A1 | 7/2006 |
| EP | 1995952 A1 | 11/2008 |
| JP | 2004-126749 | 4/2004 |
| JP | 2006-222958 | 8/2006 |
| JP | 2006-352186 | 12/2006 |
| JP | 2007-043659 | 2/2007 |
| WO | 03073229 | 9/2003 |
| WO | 2007026126 | 3/2007 |
| WO | 2007102413 A1 | 9/2007 |

OTHER PUBLICATIONS

EP Office Action dated Mar. 31, 2015; EP Patent Application No. 08862385.5.
Korean Office Action dated Dec. 28, 2014, in Korean Patent Application No. 10-2010-7015970.
International Search Report and Written Opinion mailed Nov. 15, 2011, in PCT Patent Application No. PCT/CA2011/00932.
"HD HQV Benchmark Testing & Scoring Guide", from http:gizmodo.com, Jun. 6, 2007.
EPC Communication pursuant to Article 94(3) dated May 21, 2013, in EP Application No. 08865646.7.
Atala, Jamie Jo., USPTO Communication dated Sep. 7, 2011, in U.S. Appl. No. 12/339,563, filed Dec. 19, 2008.
Atala, Jamie Jo., USPTO Communication dated Feb. 10, 2012, in U.S. Appl. No. 12/339,563, filed Dec. 19, 2008.
Rahman, Mustafizur, USPTO Communication dated Sep. 30, 2011, in U.S. Appl. No. 12/338,386, filed Dec. 18, 2008.
Rahman, Mustafizur, USPTO Communication dated Mar. 2, 2012, in U.S. Appl. No. 12/338,386, filed Dec. 18, 2008.
Rahman, Mustafizur, USPTO Communication dated Aug. 2, 2013, in U.S. Appl. No. 12/338,386, filed Dec. 18, 2008.
Christensen, Scott B., USPTO Communication dated Oct. 25, 2011 in U.S. Appl. No. 12/245,216, filed Oct. 3, 2008.
Christensen, Scott B., USPTO Communication dated Apr. 28, 2011 in U.S. Appl. No. 12/245,216, filed Oct. 3, 2008.
Chinese Office Action dated Feb. 4, 2013, in Chinese Patent Application No. 200880127097.5.
International Search Report and Written Opinion mailed Feb. 4, 2010, in PCT Patent Application No. PCT/US2009/059162.
Baig, Sahar A., USPTO Communication dated Mar. 18, 2013, in U.S. Appl. No. 12/860,549, filed Aug. 20, 2010.
Baig, Sahar A., USPTO Communication dated Jul. 11, 2012, in U.S. Appl. No. 12/860,549, filed Aug. 20, 2010.
"802.3" posted Dec. 27, 200 on Whatis.com.
Debooer, "Video processing in DVD players, receivers and displays," Audioholics Online an Magazine, dated Mar. 25, 2007, from www.audioholics.com.
EPC Communication pursuant to Article 94(3) dated Dec. 20, 2012, in EP Application No. 08861200.7.
Ritchie et al., UPnP AV Architecture:1, Jun. 25, 2002, pp. 1-22, vol. 1.
European Extended Search Report dated Sep. 24, 2012, in European Application No. 08865646.7.
Silva, Robert. "Upscaling DVD Players vs. Upscaling HDTVs," http://hometheather.about.com/od/dvdbasics/qt/dvdhdtvscaling.htm, retrieved: Dec. 21, 2012.
Japanese Office Action dated Jan. 9, 2013, in Japanese Application No. 2010-538290.
HDMI Licensing LLC, "High-definition multimedia interface specification," version 1.3a, Nov. 10, 2006, HDMI Licensing LLC, p. 118-126.
"Universal Plug and Play," posted Jan. 27, 2006, on Whatis.com.
International Search Report and Written Opinion mailed Apr. 15, 2009, in PCT Patent Application No. PCT/CA2008/002187.
Chinese Office Action; Chinese Application No. 200880126956.9; dated Nov. 26, 2013.
Chinese Office Action; Chinese Application No. 200880126956.9; dated Mar. 8, 2013.
Chinese Office Action; Chinese Application No. 200880126817.6; dated Sep. 18, 2012.
EP Extended Search Report; EP Application No. 08861200.7 dated May 24, 2012.
International Search Report from Canadian Patent Office; International Application No. PCT/CA2008/002217; dated Apr. 8, 2009.
Bui, Kieu-Oanh. United States Patent and Trademark Office Office Action dated Sep. 24, 2012, in relation to U.S. Appl. No. 11/957,852, 11 pages.

(56) References Cited

OTHER PUBLICATIONS

Bui, Kieu-Oanh. United States Patent and Trademark Office Office Action dated Mar. 13, 2012, in relation to U.S. Appl. No. 11/957,852, 11 pages.
Bui, Kieu-Oanh. United States Patent and Trademark Office Office Action dated Oct. 14, 2011, in relation to U.S. Appl. No. 11/957,852, 9 pages.
Chinese Office Action; Chinese Application No. 200880126956.9; dated May 31, 2012.
HDMI Consortium; "High-Definition Multimedia Interface. Spec 1.1"; Version 1.1; May 20, 2014.
EP Extended Search Report; EP Application No. 08862385.5; dated Jul. 17, 2012.
Chinese Office Action; Chinese Application No. 200880126956.9; dated Aug. 6, 2014.
HDMI Transport Specification; TXH Blackbird; Mar. 9, 2006; pp. 1-31.
Content Descriptor Definitions; TXH Blackbird; Mar. 9, 2005; pp. 1-46.
International Search Report from Canadian Patent Office; International Application No. PCT/CA2008/002214; dated Mar. 23, 2009.
Ngheim, A.T. et al.; A New Evaluation Approach for Video Processing Algorithms; IEEE Workshop on Motion and Video Computing (WMVC'07); Feb. 2007.
State Intellectual Property Office of the People's Republic of China, Rejection Decision for Chinese Patent Application No. 200880126956.9 (related to above-captioned patent application), mailed May 4, 2015.
European Patent Office, "Official Communication", dated Dec. 1, 2015 in European Patent Application No. 38862385.5.

\* cited by examiner

| Category 60 | Type of video processing 62 | available? 64 |
|---|---|---|
| scan-rate conversion | dropping/duplicating every N frames/fields | NO |
| | 3:2 pulldown | NO |
| | 2:2 pulldown | NO |
| | temporal interpolation without motion compensation | NO |
| | temporal interpolation with motion compensation | NO |
| interlacing | scan line decimation | NO |
| | vertical de-flicker filtering | NO |
| de-interlacing | scan line duplication | YES |
| | field merging | NO |
| | scan line interpolation | NO |
| | motion adaptive de-interlacing | NO |
| | motion compensated de-interlacing | NO |
| | diagonal edge interpolation | NO |
| de-noise | temporal | NO |
| | spatial (e.g. mosquito or de-blocking) | NO |
| scaling | pixel dropping and duplication | YES |
| | linear interpolation | YES |
| | anti-aliased resampling | NO |
| | content-adaptive scaling | NO |
| color correction | fleshtone correction | YES |
| | white-point correction | NO |
| | color-saturation enhancement | NO |
| contrast correction | non-content adaptive | YES |
| | content adaptive | NO |
| detail enhancement | sharpness enhancement | YES |
| | edge enhancement | NO |
| | super-resolution | NO |

FIG. 6

| Category 60 | Type of video processing 62 | available? 64 |
|---|---|---|
| scan-rate conversion | dropping/duplicating every N frames/fields | YES |
| | 3:2 pulldown | YES |
| | 2:2 pulldown | YES |
| | temporal interpolation without motion compensation | YES |
| | temporal interpolation with motion compensation | YES |
| interlacing | scan line decimation | YES |
| | vertical de-flicker filtering | YES |
| de-interlacing | scan line duplication | NO |
| | field merging | YES |
| | scan line interpolation | YES |
| | motion adaptive de-interlacing | YES |
| | motion compensated de-interlacing | YES |
| | diagonal edge interpolation | YES |
| de-noise | temporal | YES |
| | spatial (e.g. mosquito or de-blocking) | YES |
| scaling | pixel dropping and duplication | NO |
| | linear interpolation | NO |
| | anti-aliased resampling | YES |
| | content-adaptive scaling | YES |
| color correction | fleshtone correction | NO |
| | white-point correction | YES |
| | color-saturation enhancement | YES |
| contrast correction | non-content adaptive | NO |
| | content adaptive | YES |
| detail enhancement | sharpness enhancement | NO |
| | edge enhancement | YES |
| | super-resolution | YES |

FIG. 7

METHOD, APPARATUS AND MACHINE-READABLE MEDIUM FOR APPORTIONING VIDEO PROCESSING BETWEEN A VIDEO SOURCE DEVICE AND A VIDEO SINK DEVICE

RELATED CO-PENDING APPLICATIONS

This application is a continuation of U.S. patent application Ser. No. 11/957,938, filed Dec. 17, 2007, U.S. Pat. No. 8,866,971, and is related to application Ser. No. 11/957,852, U.S. Pat. No. 8,479,253, entitled "METHOD, APPARATUS AND MACHINE-READABLE MEDIUM FOR VIDEO PROCESSING CAPABILITY COMMUNICATION BETWEEN A VIDEO SOURCE DEVICE AND A VIDEO SINK DEVICE", filed Dec. 17, 2007, having docket number 36544.00.0054, inventor David Glen, owned by instant Assignee and is incorporated herein by reference.

FIELD OF TECHNOLOGY

The present disclosure relates to video processing, and more particularly to a method, apparatus and machine-readable medium for apportioning video processing between a video source device and a video sink device.

BACKGROUND

It is not uncommon for video source devices (i.e. devices capable of outputting a video signal comprising data representative of a video image, such as Digital Versatile Disc (DVD) players, High-Density (HD) DVD players, Blu-ray disc players, set-top boxes, or PCs) and video sink devices (i.e. devices capable of receiving a video signal and further processing the data and/or displaying video images, such as televisions or monitors, which may be analog or digital devices such as Cathode Ray Tubes (CRTs), flat panel displays such as Liquid Crystal Displays (LCDs) or plasma displays, or rear-projection displays such as Digital Light Processing (DLP) displays or Liquid Crystal on Silicon (LCoS) displays for example) to be purchased separately. For example, a consumer assembling a home entertainment system may purchase the video source device component from one manufacturer and the video sink device component from another manufacturer. The consumer's choice of components may be motivated by such factors as consumer preference, availability, or retailer promotions. The consumer may then interconnect the components within the home entertainment system so that the source device outputs video data to the sink device. The interconnection may be by way of one or more cables and may conform to a known industry standard, such as VGA, composite/S-video or component out, Digital Visual Interface (DVI), High-Definition Multimedia Interface™ (HDMI™) or DisplayPort®, for example.

Many contemporary video source devices are capable of applying numerous video processing algorithms to video data to improve the appearance or quality of the video images comprising the output video data. The video processing algorithms may fall into various categories, such as scan-rate conversion, interlacing, de-interlacing, de-noise, scaling, color correction, contrast correction and detail enhancement for example. As an example of types of video processing algorithms that might exist in a video processing category, the interlacing category may include scan line decimation algorithm and a vertical de-flicker filtering algorithm for example. The video processing algorithms that are actually applied at the source device at any given time may be based on various factors, such as the nature of the video data (e.g. frame rate) or user preferences (e.g. an indication to use the maximum frame rate possible). Video processing algorithms may be affected in software, hardware, firmware or combinations of these. A video processing algorithm may for example be associated with a functional block of a video processor.

A video sink device may also be capable of applying numerous video processing algorithms to received video data, including some or all of the same video processing algorithms that the upstream video source device is capable of performing (referred to as "overlapping video processing capabilities"). The overlap may be by virtue of the fact that the video sink device is a modular component that is intended to be capable of interconnection with various types of video source devices whose video processing capabilities may vary. The video source device and video sink device may each have different strengths and weaknesses from a video processing standpoint. For example, the source device may be capable of numerous scan-rate conversion algorithms that the sink device is incapable of executing, while the sink device is capable of numerous de-interlacing algorithms that the source device is incapable of executing.

Disadvantageously, no convenient mechanism exists for apportioning video processing as between a video source device and a video sink device.

A solution which obviates or mitigates this shortcoming would be desirable.

SUMMARY

In one aspect, there is provided a method of apportioning desired video processing between a video source device and a video sink device, the method comprising, at one of the devices: based upon an indication of video processing algorithms of which the other of the video source device and the video sink device is capable and an indication of video processing algorithms of which the one device is capable: identifying a set of video processing algorithms for achieving desired video processing; and classifying the video processing algorithms of the set into a first subset of video processing algorithms for performance by the other device and a second subset of video processing algorithms for performance by the one device; and sending at least one command for causing the other device to effect the first subset of video processing algorithms.

In another aspect, there is provided a method of apportioning desired video processing between a video source device and a video sink device, the method comprising, at one of the devices: sending an indication of video processing algorithms of which the one device is capable to the other of the video source device and video sink device; and receiving from the other device at least one command for causing the one device to effect at least one of the video processing algorithms.

In yet another aspect, there is provided a machine readable medium storing instructions that, when executed by a processor of one of a video source device and a video sink device, cause the one device to: based upon an indication of video processing algorithms of which the other of the video source device and the video sink device is capable and an indication of video processing algorithms of which the one device is capable: identify a set of video processing algorithms for achieving desired video processing; and classify the video processing algorithms of the set into a first subset of video processing algorithms for performance by the other device and a second subset of video processing algorithms for performance by the one device; and send at least one command for causing the other device to effect the first subset of video processing algorithms.

In yet another aspect, there is provided a video source device comprising a processor and memory interconnected with the processor, the memory storing instructions which, when executed by the processor, cause the video source device to: based upon an indication of video processing algorithms of which a video sink device is capable and an indication of video processing algorithms of which the video source device is capable: identify a set of video processing algorithms for achieving desired video processing; and classify the video processing algorithms of the set into a first subset of video processing algorithms for performance by the video sink device and a second subset of video processing algorithms for performance by the video source device; and send at least one command for causing the video sink device to effect the first subset of video processing algorithms.

In yet another aspect, there is provided a video sink device comprising a processor and memory interconnected with the processor, the memory storing instructions which, when executed by the processor, cause the video sink device to: based upon an indication of video processing algorithms of which a video source device is capable and an indication of video processing algorithms of which the video sink device is capable: identify a set of video processing algorithms for achieving desired video processing; and classify the video processing algorithms of the set into a first subset of video processing algorithms for performance by the video source device and a second subset of video processing algorithms for performance by the video sink device; and send at least one command for causing the video source device to effect the first subset of video processing algorithms.

In yet another aspect, there is provided a machine-readable medium storing instructions that, when processed, cause the creation of a circuit capable of: based upon an indication of video processing algorithms of which one of a video source device and a video sink device is capable and an indication of video processing algorithms of which the other of the video source device and a video sink device is capable: identifying a set of video processing algorithms for achieving desired video processing; and classifying the video processing algorithms of the set into a first subset of video processing algorithms for performance by the other device and a second subset of video processing algorithms for performance by the one device; and sending at least one command for causing the other device to effect the first subset of video processing algorithms, wherein the circuit comprises the one device.

Other aspects and features of the present disclosure will become apparent to those ordinarily skilled in the art upon review of the following description of specific embodiments of the invention in conjunction with the accompanying figures.

BRIEF DESCRIPTION OF THE DRAWINGS

In the figures which illustrate an exemplary embodiment:

FIGS. 6 and 7 are schematic diagrams illustrating indications of video processing capabilities of the video source device and video sink device (respectively) of FIG. 2;

DETAILED DESCRIPTION

Figure 1:
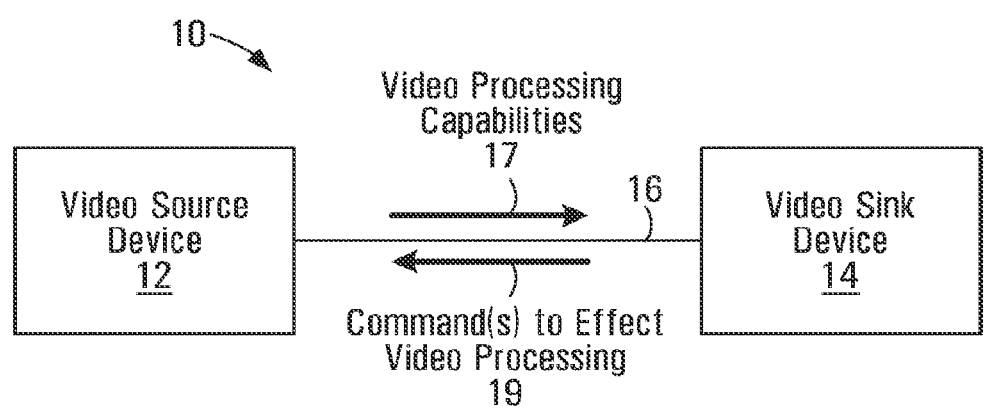
FIG. 1 is a schematic diagram of a system having a video source device and a video sink device.

Referring to FIG. 1, an exemplary system 10 is illustrated. The system 10 includes a video source device 12 and a video sink device 14 interconnected by a video data interconnection 16.

The video source device 12 is an electronic device that outputs over interconnection 16 a video signal comprising data representative of a video image. The video data can be an uncompressed digital video stream (e.g. a DVI, HDMI™, Digital Flat Panel (DFP) Interface, Open LVDS Display Interface (OpenLDI), or DisplayPort® signal), an analog video stream (e.g. YPrPb, CVBS, or VGA signal), a modulated signal containing multiple channels provided by a cable television provider, a series of Ethernet packets that are reassembled and/or decoded to form a complete video stream, a broadcast received by a satellite dish or antenna, a video stream from a DVD, information representative of objects in three-dimensional space, information retrieved from a non-volatile storage medium such as a hard drive, a computer-generated video signal, or the like. It may comprise frames or fields for example.

The video source device 12 is capable of performing various types of video processing upon the video data prior to outputting the video data over interconnection 16. The video processing may be for purposes of improving the quality of the video images or converting between video formats for example, and may include scan-rate conversion, interlacing, de-interlacing, de-noise, scaling, color correction, contrast correction or detail enhancement for example. Depending upon the nature of the video source device 12, the video that is processed may be received by video source device 12 from an external source (e.g. cable head-end or satellite), read by device 12 from a storage medium (e.g. a hard drive or optical disk), or generated by device 12 (e.g. by a software application such as a video game) for example. Exemplary video source devices 12 include PCs, DVD players, HD DVD players, Blu-ray disc players, and set-top boxes (possibly having digital video recording capabilities) receiving video signals from any of a coaxial cable, satellite dish, telephone line, broadband over power line, ethernet cable, or VHF, UHF or HD antenna for example.

Video sink device 14 is an electronic device that receives video data over interconnection 16 and performing video processing upon the received video data. In many cases, the video sink device is also capable of displaying the data as video images, but this is not necessarily true of al video sink devices. The video processing of which the video sink device 14 is capable is wholly or partly the same as the video processing of which video source device 12 is capable (i.e. the video processing capabilities of devices 12 and 14 overlap). This overlap in video processing capabilities between devices 12 and 14 may be because the devices are modular components that are intended to be capable of interconnection not only with each other but also with various types of other video source device or video sink devices whose video processing capabilities may vary. Exemplary video sink devices 14 include intermediate video processors (e.g. DVDO® iScan™ VP50) or monitors and televisions, which may be CRTs, flat panel displays such as LCD or plasma displays, or rear-projection displays such as DLP or LCoS displays for example.

The video data interconnection 16 is an interconnection for carrying signals representing video data from the video source device 12 to the video sink device 14 and for carrying other information in the same and opposite direction. The information that is carried in the same direction as the video data includes an indication of the video processing capabilities of the source device 12 and, optionally, metadata indicative of the video processing actually applied to the video data by the video source device 12. The information that is carried in the opposite direction includes one or more commands for causing the video source device 12 to effect one or more specified video processing algorithms. The transmission of this information (in both directions) is a focus of the present description. Physically, the interconnection 16 may be an electrical or optical cable, or it may simply be air between the devices 12 and 14 over which video data is wirelessly transmitted. The interconnection 16 may comply with a known video interconnect standard, such as the DVI, HDMI™, DisplayPort®, DFP Interface, OpenLDI, or Gigabit Video Interface (GVIF) standards for example. Alternatively, the interconnection 16 may be governed by a proprietary signalling protocol.

In overview, to support the apportionment of desired video processing between the video source device 12 and video sink device 14, each of the video source device 12 and video sink device 14 stores an indication of the video processing algorithms of which it is capable. The indication, may be an electronic data file preset within the device at the factory for example (e.g. in ROM) or a dynamically configurable data record that reflects the current video processing capabilities of the device. The device 12 communicates this indication to the other device 14, e.g. upon power up of the devices 12 and 14. This is schematically illustrated in FIG. 1 by way of arrow 17.

At the video sink device 14, the received indication of the video processing algorithms of which device 12 is capable and the separate (locally maintained) indication of the video processing algorithms of which device 14 is capable collectively indicate a totality of available video processing algorithms. A set of video processing algorithms of this totality for achieving the desired video processing is identified. The identified video processing algorithms are classified in two subsets: a first subset for performance by the video source device 12 and a second subset for performance by the video sink device 14. The classification may be governed by such criteria as maximizing the quality of the video images, conserving power at one or both of the devices, or balancing the video processing load between the devices for example. These criteria may be configurable by the user by way of a graphical user interface (GUI). Following the classification, the video sink device 14 sends one or more commands to the video source device 12 (schematically illustrated in FIG. 1 by way of arrow 19) in order to cause the device 12 to perform the video processing algorithms that have been earmarked for that device (i.e. the first subset of video processing algorithms), and configures the video sink device 14 to perform the remaining video processing algorithms (i.e. the second subset). If the second subset is empty (e.g. if all of the video processing algorithms to be performed are earmarked for the video source device 12), then configuration of the video sink device 14 may be unnecessary. The command(s) sent to the video source device 12 may expressly instruct the device 12 to deactivate the video processing algorithms of the second subset; alternatively, the device 12 could operate with the understanding that it should only activate the video processing algorithms that it is instructed to activate, and to deactivate all other algorithms. The video sink device 14 thus acts as a "master" in terms of determining the apportionment of video processing between devices, and the video source device 12 acts as a "slave" in terms of effecting the video processing that it is commanded to effect.

Optionally, the video source device 12, upon activating at least one video processing algorithm responsive to the received command(s), may thereafter communicate metadata along with the processed video data that it transmits to the device 14, which metadata reflects the video processing algorithms that have been applied to the video data by device 12. When such metadata is communicated, then the video sink device 14 may use it to confirm whether the transmitted command(s) have in fact resulted in the performance of the desired video processing algorithms at the video source device 12. If the video sink device 14 determines that any video processing algorithm of the first subset has not been effected, it may take remedial steps, such as configuring the video sink device 14 to perform that video processing algorithm at the video sink device 14. Alternatively, if the metadata evidences that a video processing algorithm that was expected to be deactivated at the video source device 12 is still active at that device (e.g. because a user of that device has manually activated the algorithm), then the video sink device 14 may take the remedial step of deactivating its own video processing algorithm of that type to avoid needless duplication of effort.

In an alternative embodiment (not shown in FIG. 1), the role of the devices 12 and 14 in terms of video processing apportionment is reversed. That is, device 12 acts as the master and device 14 acts as the slave, rather than the opposite. In this case, the direction of arrows 17 and 19 is reversed, and the metadata that is communicated by the slave device (if any) is communicated "upstream" from the video sink device 14 to the video source device 12.

Advantageously, the above-described embodiments can provide such benefits as higher quality video images (e.g. through election of video processing algorithms as between the two devices that result in the highest quality images), reduced power consumption at one device or the other (e.g. by shifting power-hungry video processing from, say, a battery powered device to the other device that is not battery powered), or balancing the video processing so that neither device is overburdened or underutilized.

Figure 2:
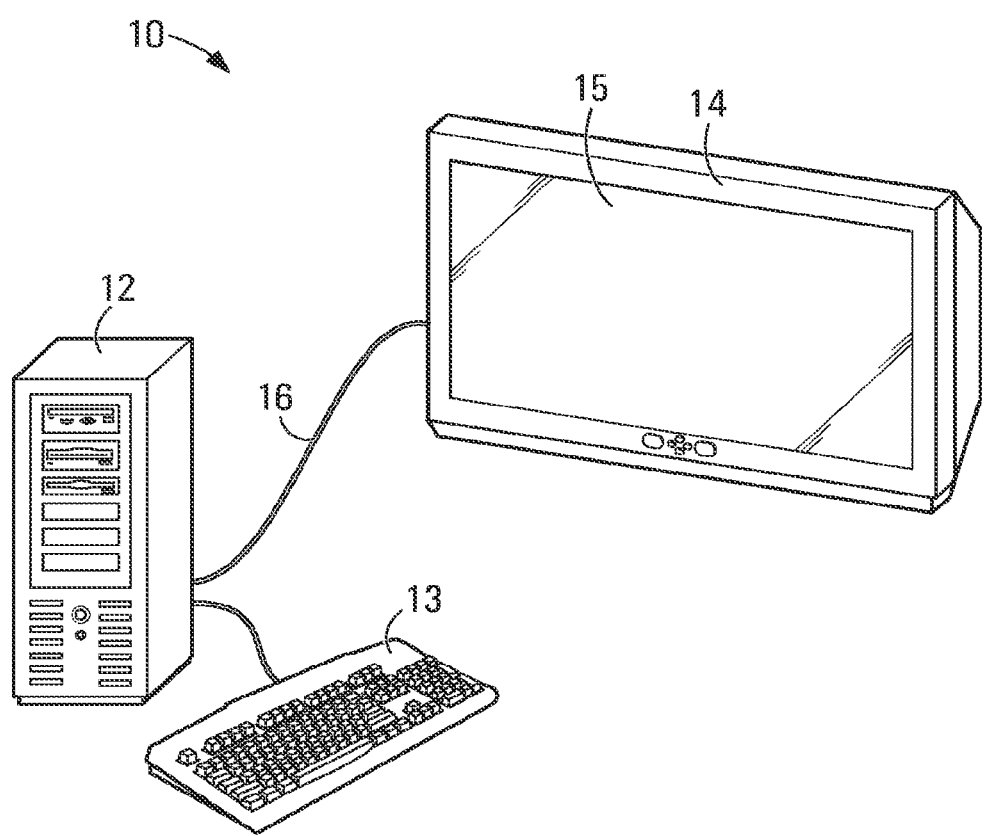
FIG. 2 is a schematic diagram illustrating in greater detail an exemplary system having a video source device and a video sink device.

FIG. 2 illustrates an exemplary system 10 in greater detail. In FIG. 2, the video source device 12 is a personal computer (or, more accurately, the CPU box 12 of a personal computer), the sink device 14 is an LCD television, and the interconnection 16 is a cable interconnecting the CPU box 12 with the television 14.

The CPU box 12, as its name suggests, is the portion of the personal computer which contains the main processor or CPU. The CPU box 12 includes various components other than the CPU, such as a power supply, memory, peripheral cards and cooling fan for example, none of which are illustrated. Notably, the CPU box 12 includes a graphics subsystem (GSS), which is modified from a conventional GSS to be capable of providing an indication of GSS video processing capabilities to television 14 and of receiving commands from television 14 to activate one or more video processing algorithms, as described below.

A user input mechanism 13, such as a keyboard (as illustrated in FIG. 2), mouse, trackball, touch screen, tablet or combination of such devices, is also attached CPU box 12 and permits user to control the personal computer.

Video sink device 14 is an LCD television which displays video data originating from the CPU box 12, and in particular, from the graphics subsystem of box 12, on its LCD screen 15. The television 14 is capable of applying various video processing algorithms to video data comprising the video signal received from CPU box 12, as described below.

The cable 16 carries signals representing video images (video data) from the graphics subsystem of the CPU box 12 to the sink device 14. In the present embodiment, the cable 16 conforms to the HDMI™ specification (e.g. HDMI™ specification version 1.0, 1.1, 1.2a, 1.3, 1.3a or 1.3b), thus the signals are digital signals. HDMI™ interconnections such as cable 16 conform to the Display Data Channel (DDC) standard, which is known in the art. The DDC standard is promulgated by the Video Electronics Standards Association (VESA) and governs communication between a sink device and a graphics subsystem. The DDC standard provides a standardized approach whereby a video sink device can inform a video source device about its characteristics, such as maximum resolution and color depth, so as to permit the video source device to cause valid display configuration options to be presented to a user for example. Mechanically, the cable 16 incorporates three lines/pins for communicating sink device characteristics, namely, data, clock and ground, in accordance with the DDC standard. The specific version of the DDC standard to which the cable 16 of the present embodiment conforms is the Enhanced Display Data Channel (E-DDC™) Standard, Version 1.1 (Mar. 24, 2004). This standard is also promulgated by VESA (www.vesa.org). As will become apparent, the DDC channel is used in the present embodiment to carry commands in the upstream direction for causing the video processing algorithms earmarked for video source device 12 to be effected, as part of the apportionment of video processing between the devices 12 and 14. The cable 16 also carries an indication of the video processing algorithms of which video source device 12 is capable, in the downstream direction, to video sink device 14. For clarity, the terms "upstream" and "downstream" as used herein are relative to the general direction of flow of video data between the devices, which is from device 12 to device 14.

Figure 3:
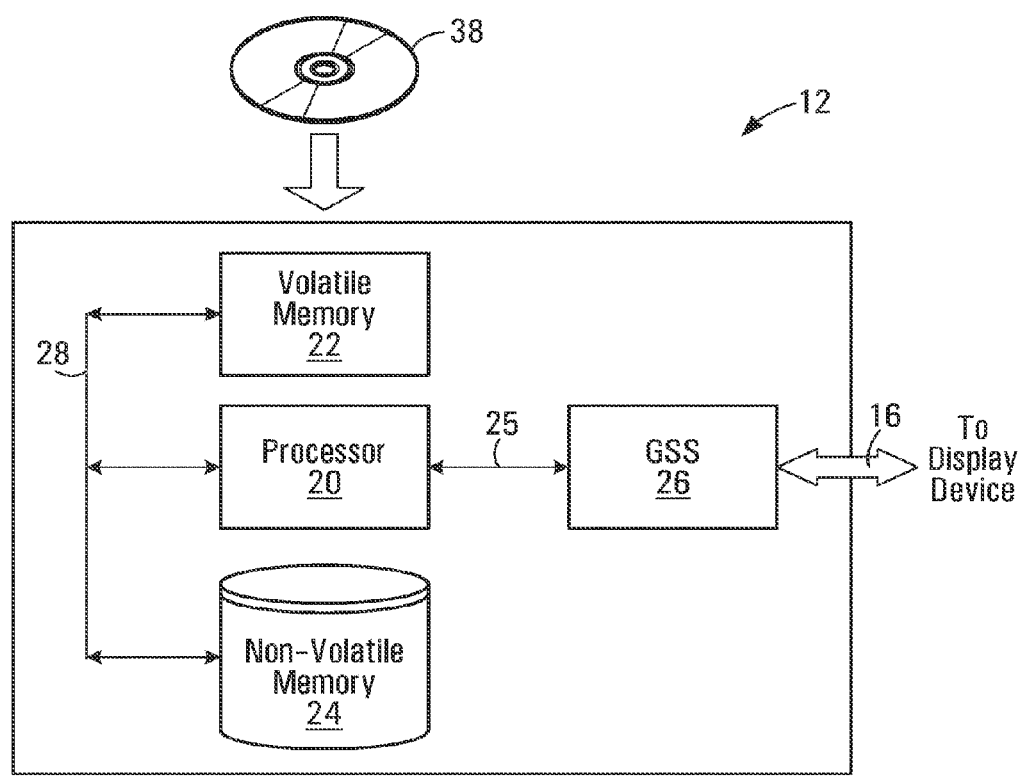
FIG. 3 is a schematic diagram illustrating a CPU box of the video source device of FIG. 2.

FIG. 3 illustrates the CPU box 12 of FIG. 2 in greater detail. As illustrated, the CPU box 12 includes a processor 20, volatile memory 22, non-volatile memory 24 and a graphics subsystem 26.

Processor 20 is the main processor of the CPU box 12 of FIG. 3. The processor 20 is conventional and may for example be a Pentium® microprocessor manufactured by Intel Corporation or an Athlon® micro-processor manufactured by Advanced Micro Devices, Inc. ("AMD"). Other types of processors manufactured by other corporations, such as Motorola, Inc., International Business Machines Corp., or Transmeta Inc., could alternatively be employed.

Volatile memory 22 is conventional random access memory which stores executable software and data during the operation of the system 10. Volatile memory 22 may be a form of Dynamic Random Access Memory (DRAM) for example. The executable software stored in memory 22 includes operating system software and application software. The operating system software may be a executable code representing conventional operating system such as Windows XP, Windows 2000, Windows NT®, Windows Vista® or Linux® for example. Other operating systems, such as UNIX®, Mac OS(TMO), Solaris, Sun-OS, or HP-UX, could be employed in alternative embodiments. The application software may be a conventional application, such as a media player or video game, which causes 2D or 3D video images to be generated for display.

Non-volatile memory 24 is a conventional form of non-volatile memory, such as a hard disk drive for example, which may store executable software and data when the system 10 (FIG. 2) is powered down.

Processor 20, volatile memory 22 and non-volatile memory 24 are interconnected by way of a system bus 28. The specific implementation of bus 28 is not central to the present description.

Video data may be converted from a logical representation of 2D or 3D images by the GSS 26 before being output. In the present embodiment, the GSS 26 is a stand-alone expansion card, such as a Radeon® X800, Radeon® X800 Pro, or Radeon® X600 card manufactured by AMD. The GSS 26 could however be integrated into a motherboard of CPU box 12 in alternative embodiments. The interconnection 25 between the main processor 20 and GSS 26 in FIG. 2 may conform to a known bus specification such as the Accelerated Graphics Port (AGP) or PCI Express™ interface specifications. The GSS 26 serves as the point of connection for cable 16 of FIG. 1 at CPU box 12 (e.g. at the backplane of CPU box 12). The GSS of the present embodiment is capable of executing various video processing algorithms, as will be described.

Figure 4:
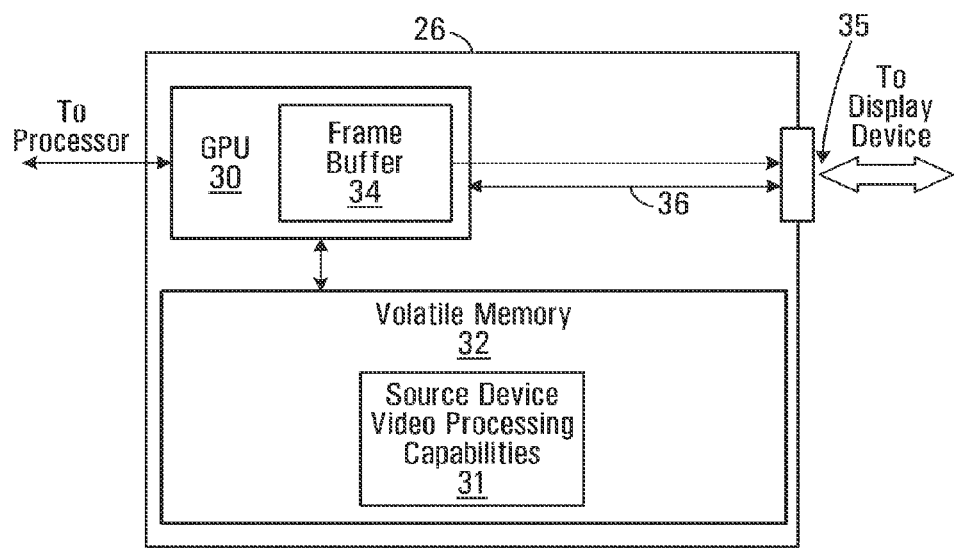
FIG. 4 is a schematic diagram illustrating a graphics subsystem of the CPU box of FIG. 3.

FIG. 4 illustrates the GSS 26 of FIG. 3 during system operation. As illustrated, the GSS 26 includes a graphics processing unit 30 and volatile memory 32. Other components have been omitted for clarity.

The graphics processing unit 30 is the processing engine which is responsible for generating the video data that is communicated over cable 16 to video sink device 14 of FIG. 2, e.g. through conversion of a logical representation of a 2D or 3D image. The GPU 30 of the present embodiment is configured to be capable of performing video processing algorithms in the following categories: de-interlacing (scan line duplication only), scaling (pixel dropping and duplication or linear interpolation), color correction (fleshtone correction only), contrast correction (non-content adaptive contrast correction only), and detail enhancement (sharpness enhancement only). The GPU 30 of the present embodiment is not, however, configured to be capable of performing other categories of video processing, such as scan-rate conversion, interlacing and de-noise. It will be appreciated that, in other embodiments, the GPU 30 (or, more generally, video source device 12), may be configured to be capable of executing different types of video processing algorithms in the same or different categories. For clarity, the term "video processing algorithm" as used herein should not be understood to necessarily connote a software implementation. A video processing algorithm may be effected in software, hardware (e.g. integrated circuitry), firmware, or combinations of these. In some embodiments, each category of video processing algorithms may be represented by functional block within a video processor, wherein each functional block is capable of performing at least one algorithm.

The GPU 30 includes a frame buffer 34. Frame buffer 34 is a buffer that stores processed video data which is ready for transmission to the sink device 14. Its output is connected to the socket at backplane 35 to which cable 16 (FIG. 2) is connected by way of a HDMI™ transmitter (not illustrated). The HDMI™ transmitter is responsible for converting the video data for transmission over cable 16 in accordance with the operative HDMI™ standard. In alternative embodiments, the frame buffer 34 could form part of volatile memory 32 (described below).

Volatile memory 32 serves as temporary storage for image data during the application of video processing by GPU 30. Memory 32 is typically a form of RAM which supports high-speed memory access. Memory 32 is interconnected with GPU 30 in conventional manner. Memory 32 stores an indication of video processing capabilities 31 of the video source device 12 (or, more specifically, of the GSS 26 component of video device 12) of which it forms a part. The indication 31 originates from non-volatile memory of GSS 26 (e.g. ROM) in the present embodiment.

Operation of the video source device 12 (and, more specifically, of GSS 26) as described herein may be governed by executable instructions loaded from a machine-readable medium 38, such as a optical disk, magnetic disk or read only memory chip for example, into volatile memory 22 (FIG. 3) or volatile memory 32 (FIG. 4). For example, this code may take the form of a driver, which is part of the operating system executing at CPU box 12.

Figure 5:
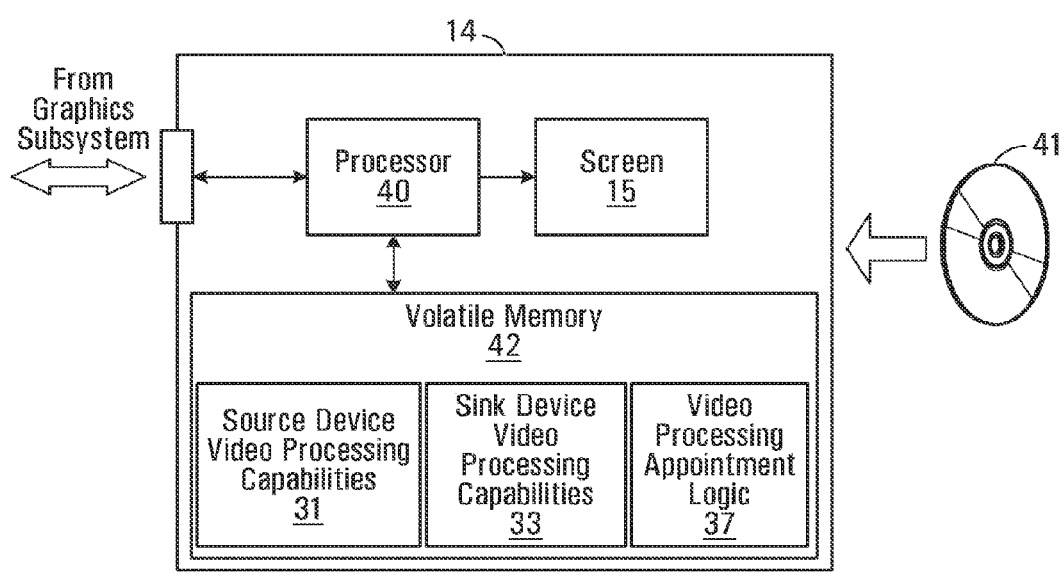
FIG. 5 is a schematic diagram illustrating the video sink device of FIG. 2 in greater detail.

FIG. 5 illustrates the video sink device 14 of FIG. 2 during system operation. As illustrated, video sink device 14 includes a processor 40, memory 42 and a screen 15 interconnected in a conventional manner. Operation of video sink device 14 as described herein may be governed by instructions loaded from a machine-readable medium 41, such as an optical disk, magnetic disk or read only memory chip for example, which may be executed by processor 40. Various other components of the sink device 14, such as a HDMI™ receiver for receiving video data over interconnection 16 and forwarding decoded video data to processor 40 and audio components (e.g. audio enhancement processor, speakers), are omitted from FIG. 5 for clarity.

Processor 40 is a video and graphics processor which receives video data and executes various video processing algorithms upon that data. The processor 40 is capable of performing video processing algorithms in each of the following categories: scan-rate conversion, interlacing, de-interlacing, de-noise, scaling, color correction, contrast correction, and detail enhancement. The processor 20 receives video data from the GSS 26 via cable 16 (and via an HDMI™ receiver, not illustrated), which is connected to the sink device 14, e.g. at its backplane.

Volatile memory 42 stores an indication 31 of the video processing capabilities of the video source device 12 and an indication 33 of video processing capabilities of television 14. The indication 31 is received at run time in a downstream communication from the video source device 12 while the indication 33 is read from non-volatile memory (e.g. ROM) of television 14. In addition, memory 42 stores video e.g. machine-processing apportionment logic 37. The logic 37, which may take the form of software (executable instructions), applies the currently operative criteria, (e.g. maximum image quality, power conservation, and/or load balancing) governing video processing apportionment. The logic 37 is user-configurable in the present embodiment by way of a GUI, described below. The rules 37 may be read from local ROM at system startup.

FIGS. 6 and 7 illustrate, in greater detail, the indications 31 and 33 of the video processing capabilities of devices 12 and 14 (respectively).

Referring to FIG. 6, the indication 31 is represented in the form of a table. It will be appreciated that the actual form of indication 31 within system 10 may be binary or textual (e.g. markup language) for example. Each of ten different categories of video processing of which the video source device 12 may be capable—namely, scan-rate conversion, interlacing, de-interlacing, de-noise, scaling, color correction, contrast correction and detail enhancement—is represented as a primary row within the table of FIG. 6, with the category being identified in column 60. Within each category, at least two video processing algorithms are more specifically identified in column 62. Each video processing algorithm is represented as a secondary row within the primary row of the table. For example, the primary row representing the scan-rate conversion category includes one secondary row for each of the following five video processing algorithms in that category: dropping/duplicating every N frames/fields, 3:2 pulldown, 2:2 pulldown, temporal interpolation without motion compensation, and temporal compensation with motion compensation. The capacity of device 12 to execute each video processing algorithm is indicated in column 64. Based on the values of FIG. 6, for example, it should be apparent that device 12 is not capable of performing any of the scan-rate conversion or interlacing algorithms identified in the table, but is capable of executing one de-interlacing algorithm, namely scan line duplication.

FIG. 7 illustrates the indication 33 of video processing capabilities the sink device 14, using the same conventions as FIG. 6. Based on FIG. 7, it will be apparent that device 14 is capable of performing all of the various scan-rate conversion, interlacing and de-interlacing algorithms identified within the table, but is only capable of performing a subset of the video processing algorithms within the de-noise, scaling, color correction, contrast correction and detail enhancement video processing categories. The indication 33 may be implemented in the same matter as indication 31 (e.g. they may be data structures having a common format for consistency).

For clarity, the video processing algorithms identified in certain categories of video processing within the tables of FIGS. 6 and 7 are briefly described below.

Scan-Rate Conversion

Dropping/duplicating every N frames/fields—this is a simple form of scan-rate conversion in which one out of every N fields is dropped or duplicated. For example, the conversion of 60-Hz to 50-Hz interlaced operation may drop one out of every six fields. A possible disadvantage of this technique is apparent jerky motion referred to as "judder".

3:2 Pulldown—this technique is commonly used when converting 24 frames/second content to NTSC (59.94-Hz field rate). The film speed is slowed down by 0.1% to 23.976 (24/1.001) frames/second. Two film frames generate five video fields.

Other Pulldown—other types of pulldown, e.g. 2:2, 24:1 and others, may be performed.

Temporal Interpolation—this technique generates new frames from the original frames as needed to generate the desired frame rate. Information from both past and future input frames may be used to optimally handle appearing and disappearing objects. When converting from 50-Hz to 60-Hz using temporal interpolation, there are six fields of 60-Hz video for every five fields of 50-Hz video. After both sources are aligned, two adjacent 50-Hz fields are mixed together to generate a new 60-Hz field.

Motion Compensation—motion compensation attempts to identify true motion vectors within the video data and to use this information to during temporal interpolation to minimize motion artifacts. This can result in smooth and natural motion free from judder.

Interlacing

Scan Line Decimation—in this approach, every other active scan line in each non-interlaced frame is discarded.

Vertical De-Flicker Filtering—in this approach, two or more lines of non-interlaced data are used to generate one line of interlaced data. Fast vertical transitions are smoothed out over several interlaced lines.

De-Interlacing

Scan Line Duplication—scan line duplication duplicates the previous active scan line. Although the number of active scan lines is doubled, there is no increase in the vertical resolution.

Field Merging—this technique merges two consecutive fields together to produce a frame of video. At each field time, the active scan lines of that field are merged with the active scan lines of the previous field. The result is that for each input field time, a pair of fields combine to generate a frame. Moving objects may have artifacts, also called "combing," due to the time difference between two fields.

Scan Line Interpolation—scan line interpolation generates interpolated scan lines between the original active scan lines. The number of active scan lines is doubled, but the vertical resolution is not. In a simple implementation, linear interpolation is used to generate a new scan line between two input scan lines. Better results, may be achieved by using a Finite Impulse Response (FIR) filter:

Motion Adaptive De-interlacing—in "per pixel" version of this approach, field merging is used for still areas of the picture and scan line interpolation is used for areas of movement. To accomplish this, motion, on a sample-by-sample basis, is detected over the entire picture in real time. Several fields of video at thus processed at once. As two fields are combined, full vertical resolution is maintained in still areas of the picture. A choice is made as to when to use a sample from the previous field (which may be in the "wrong" location due to motion) or to interpolate a new sample from adjacent scan lines in the current field. Cross-fading or "soft switching" is used to reduce the visibility of sudden switching between methods. some solutions may perform "per field" motion adaptive de-interlacing to avoid the need to make decisions for every sample, as is done in "per pixel" motion adaptive de-interlacing.

Motion Compensated De-interlacing—motion compensated (or "motion vector steered") de-interlacing, which is several orders of magnitude more complex than motion adaptive de-interlacing, requires calculating motion vectors between fields for each sample and interpolating along each sample's motion trajectory. Motion vectors are also found that pass through each of any missing samples.

Diagonal Edge Interpolation—searches for diagonal lines and attempts to interpolate along those lines in order to remove apparent "staircase" effects.

Scaling

Pixel Dropping and Duplication—in this approach, which may be referred to as "nearest neighbor" scaling, only the input sample closest to the output sample is used. In pixel dropping, X out of every Y samples are thrown away both horizontally and vertically. A modified version of the Bresenham line-drawing algorithm is typically used to determine which samples not to discard. In pixel duplication, which can accomplish simple upscaling, X out of every Y samples are duplicated both horizontally and vertically.

Linear Interpolation—in this approach, when an output sample falls between two input samples (horizontally or vertically), the output sample is computed by linearly interpolating between the two input samples.

Anti-Aliased Resampling—this approach may be used to ensure that frequency content scales proportionally with the image size, both horizontally and vertically. In essence, the input data is upsampled and low-pass filtered to remove image frequencies created by the interpolation process. A filter removes frequencies that will alias in the resampling process.

Content-Adaptive Scaling—scaling is based in part on the data being scaled (in contrast to a universally-applied scaling algorithm).

Color Correction

Fleshtone correction, white-point correction and color-saturation enhancement are all examples of different types of color correction algorithms that might be applied, in the alternative or in combination.

Detail Enhancement

Sharpness Enhancement—sharpness is increased through, e.g., examination of the brightness of adjacent pixels and enhancing contrast between them.

Edge Enhancement—detecting angles or edges within an image and amplifying them as a whole.

Super-Resolution—in order to improve the resolution of an image feature, information about the feature is collected over a sequence of frames in which the feature appears. That information may then be used to increase the sharpness of the feature in each of the frames.

It should be appreciated that the foregoing video processing algorithms are merely illustrative, and may differ in alternative embodiments.

Figure 8:
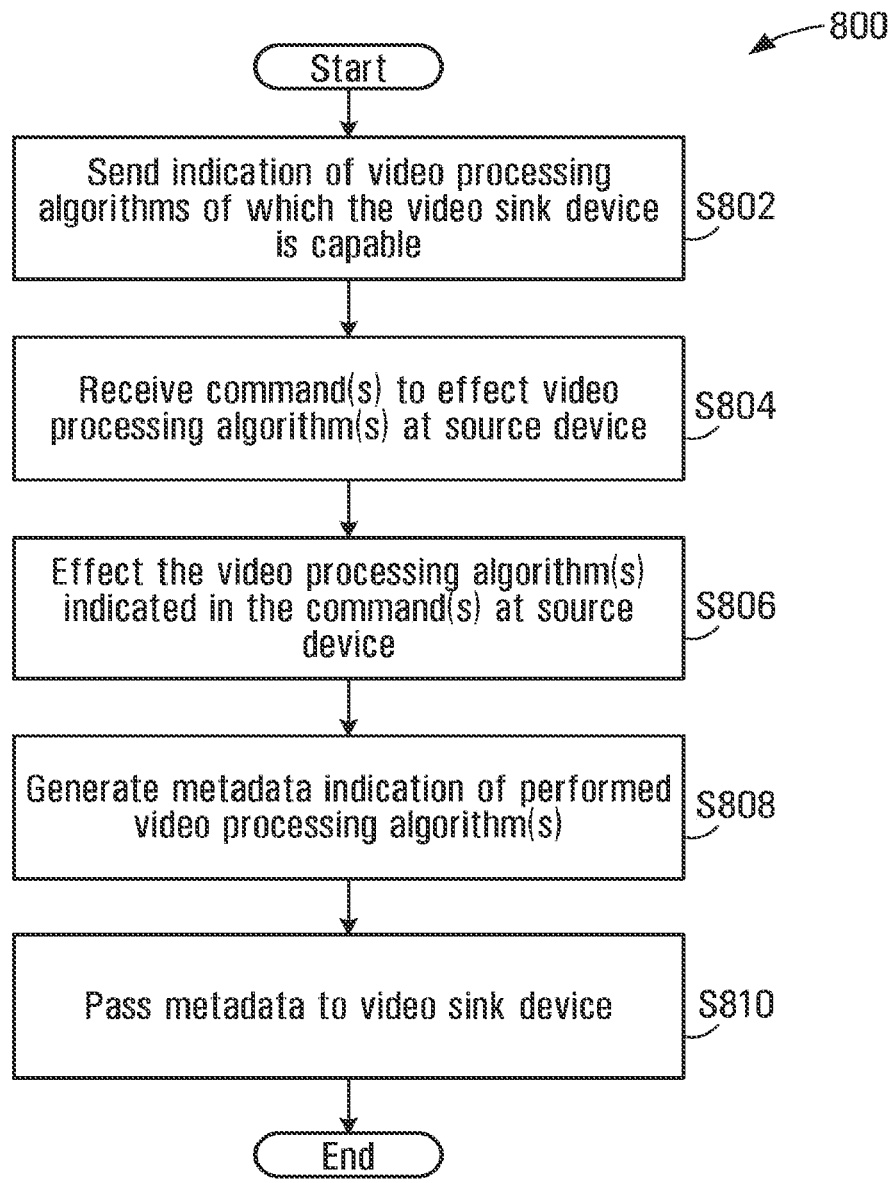
FIG. 8 is a flowchart illustrating operation of the video source device of FIG. 2.
Figure 9:
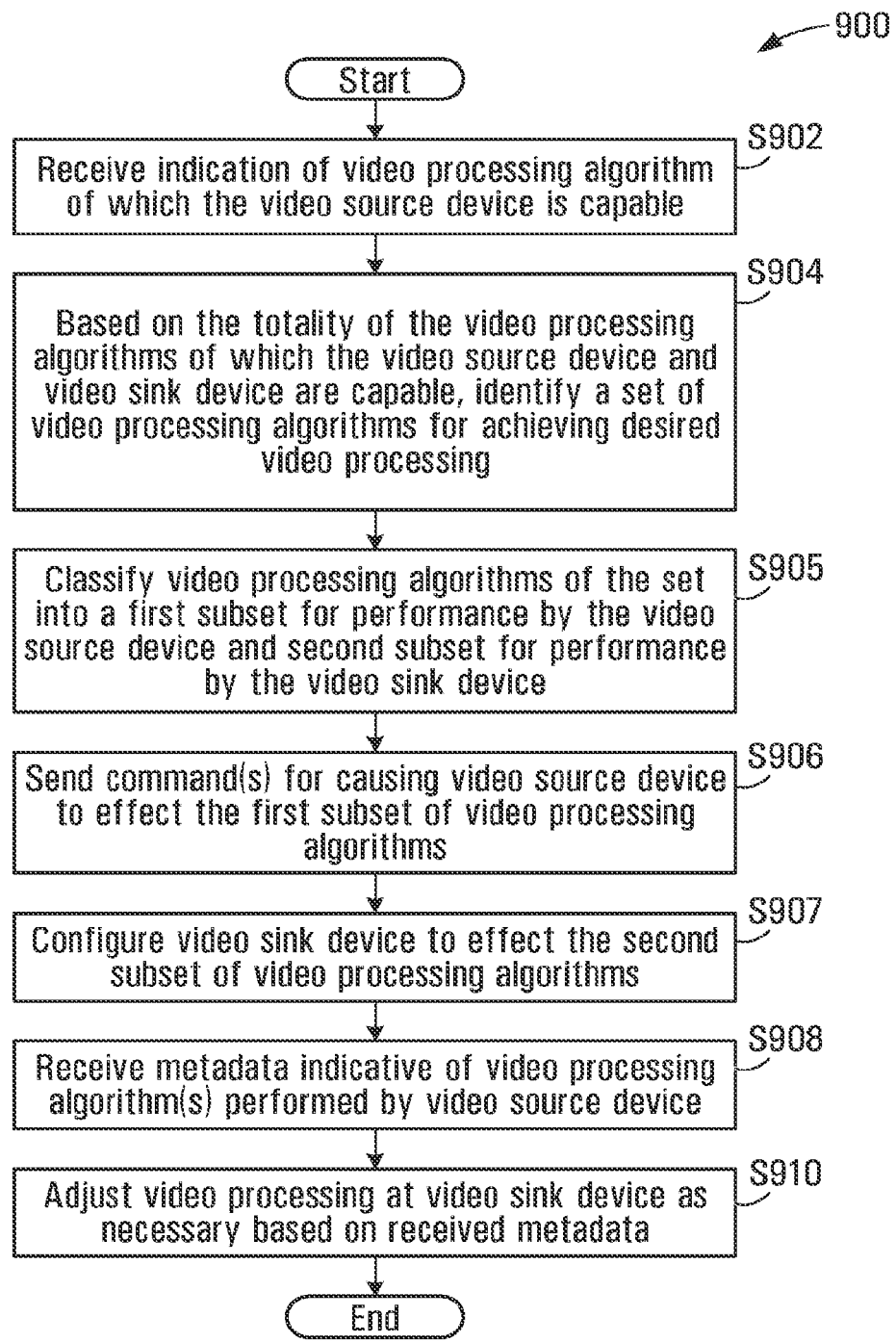
FIG. 9 is a flowchart illustrating operation of the video sink device of FIG. 2.

FIGS. 8 and 9 illustrate operation 800 and 900 of the present embodiment for communicating indication of video processing capabilities between video source device 12 and video sink device 14 within the system 10. Operation 800 occurs at device 12 (specifically, at GSS 26) while operation 900 occurs at device 14.

It is assumed that, prior to commencement of operation 800 and 900, a user has specified apportionment criteria for use by the apportionment logic 37 of video sink device 14 (FIG. 5) in determining what video processing should be done by video source device 12 and what video processing should be done by device 14. In the present embodiment, this is done through a GUI 1000, which is illustrated in FIG. 10.

Figure 10:
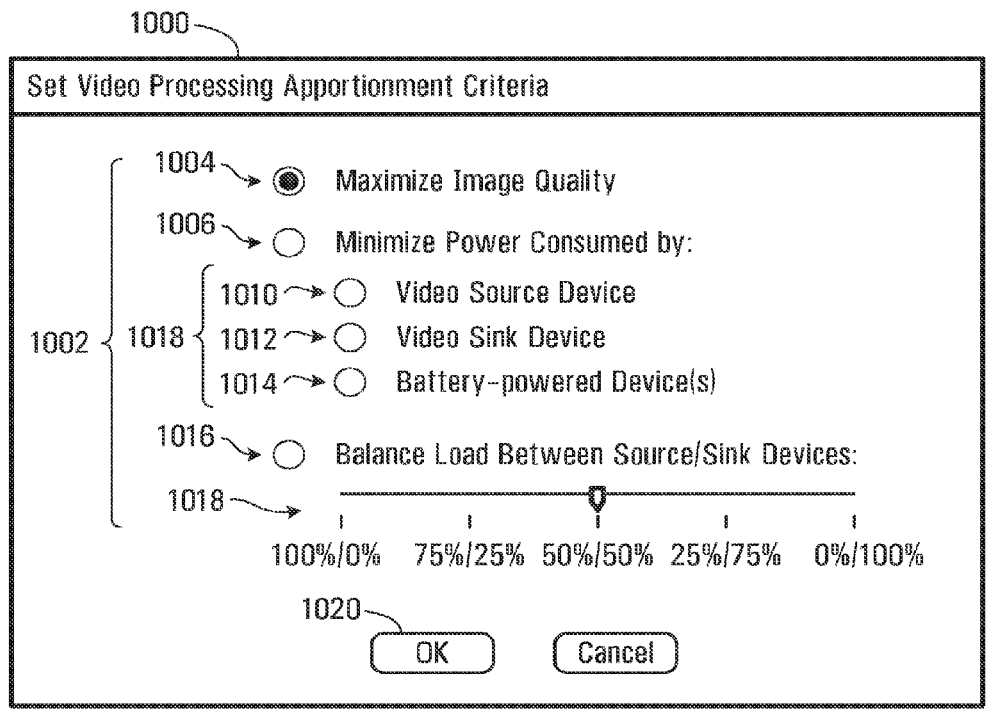
FIG. 10 is an illustration of a graphical user interface effected by the video sink device of FIG. 2.

Referring to FIG. 10, GUI 1000 includes a radio button group 1002 containing three radio buttons 1004, 1006, and 1016 for selecting as the operative criterion one of three video processing apportionment criteria. The first radio button 1004 selects maximizing image quality as the operative criterion. The second radio button 1006 selects power conservation as the operative criterion. The third radio button 1016 selects load balancing between the video source device 12 and video sink device 14 as the operative criterion. In the present embodiment, selection of one criterion deselects the others by operation of the radio buttons. In other embodiments, the criteria may not be mutually exclusive. In alternative embodiments, the apportionment criteria may differ in whole or in part from those indicated above.

The second radio button 1006 includes a subordinate radio button group 1008 for specifying whether power conservation is to be effected at video source device 12 (radio button 1010), video sink device 14 (radio button 1012), or at any device(s) 12 and/or 14 that are powered by battery (radio button 1014). The radio button group 1008 may remain ghosted (i.e. greyed out) until button 1006 has been selected.

The third radio button 1016 includes a slider 1018 for specifying a target balance of video processing computational load between the devices 12 and 14. As shown in FIG. 10, the target balance indicated on the graduations of slider 1018 is expressed in the format XX %/YY %, where XX is the percentage of the load to be handled by the video source device 12 and YY is the percentage of the load to be handled by the video sink device 14 (wherein XX and YY total 100). It should be appreciated that apportionment of video processing with such precision as to achieve the exact balance indicated by the slider 1018 may be impossible, thus video processing apportionment logic 37 may simply use best efforts to effect the specified balance (e.g. it may effect the load balance that is closest to the desired balance of all possible load balancing alternatives given the video processing to be apportioned). Movement of the slider may be restricted to jumping between the graduations.

It is noted that selection of radio buttons 1006 or 1016 to specify the apportionment criteria of power conservation or load balancing (respectively) may be motivated by the user's desire to avoid excessive heat generation by video processing circuitry within device 12 or 14 proximate to the user, e.g. to avoid the activation of a cooling fan which the user may consider to be undesirably noisy.

In some embodiments, GUI 1000 of FIG. 10 might be combined with other user preference settings for video, in order to simplify the user experience in configuring the system 10. Moreover, the video user preferences GUIs of some embodiments may not expressly state that the settings bear upon video processing apportionment. Rather, the GUIs may simply permit selection of the desired benefit (e.g. maximizing image quality, extending battery life or limiting fan noise) without indicating that video apportionment is the mechanism for achieving that benefit. This may be based on a belief that a typical user is unconcerned with the details of video processing apportionment as long as the desired benefit is provided.

In the illustrated embodiment, upon user selection of one of the three options represented by radio buttons 1004, 1006 and 1016 (say, radio button 1004, as shown in FIG. 10), and upon user confirmation of the selection via OK button 1020, the video processing apportionment logic 37 is configured with the specified criteria (or, in the present case, criterion). This configuration may for example be achieved by storing, in memory 42 of television 14 (FIG. 5), an electronic data file (not expressly illustrated) representing the specified criteria, which may be read by the logic 37 during its execution, or by otherwise configuring logic 37.

It should be appreciated that, prior to commencement of operation 800 and 900, memory 42 of video sink device 14 (FIG. 5) does not contain the indication 31 of video processing capabilities of the video source device 12, but does contain indication 33 of the video processing capabilities of video sink device 14. The latter may be read from local ROM upon device activation.

Referring to FIG. 8, the GSS 26 initially sends the indication 31 of its video processing capabilities (representing the video processing algorithms of which the video source device 12 is capable) downstream over interconnection 16 to the video sink device 14 (S802). This may be done during initialization of the video source device 12, e.g. upon detection of the sink device 14. The rationale for transmitting the indication 31 during the initialization stage, and possibly only during that stage, is that the indication 31 is not likely to change during the period of interconnection of the devices 12 and 14. However, it is recognized that the capabilities of devices 12 and 14 could change over time, as it is not uncommon for such devices to have software/firmware updates applied/installed which provide for new and improved functionality. Generally, indication 31 may be communicated over an auxiliary channel defined by the video interconnect standard governing interconnection 16 (if any), which is auxiliary to a primary channel over which video data is communicated. For example, the indication could be sent over the DDC channel (of HDMI™ or DVI interconnections), the auxiliary channel (of DisplayPort® interconnections) and possibly even the Consumer Electronics Control (CEC) channel of HDMI™ connections. As is known in the art, the CEC channel is an optional mechanism in HDMI™ for carrying commands between video source devices and video sink device according to a common protocol. The mechanism is a single-wire, bidirectional, serial bus. HDMI™ compliant cables necessarily incorporate wiring for the CEC channel, even though implementation of the CEC protocol is presently optional for video source and sink devices. Conventionally, the CEC protocol is typically used either to support user control of both of the source and sink devices with only the remote control of one of the devices, or to permit one of the source and sink devices to automatically control the other in certain situations (e.g. when the drawer of a DVD player closes with a disk, the player device may automatically command an interconnected television to power up). The use of this channel for the above-noted purpose would therefore constitute an unconventional use of this channel as of the time of this writing. Alternatively, the indication 31 could be sent in-band with video data being communicated over the interconnection 16, e.g. multiplexed within unused portions of the video data such as vertical or horizontal blanking intervals. The specific approach for achieving such in-band embedding of indication of video processing capabilities 31 may depend upon the operative video interconnect standard governing the interconnection 16 (if any). For example, in embodiments whose interconnection conforms to the HDMI™ standard or the Consumer Electronics Association CEA 861 standard (Rev. D), the indication 31 could be embedded in one or more secondary data packets, referred to as "Info Frames" or "Info Packets", in the main channel of communication.

Referring to FIG. 9, the video sink device 14 receives the indication 31 of the video processing algorithms of which the video source device 12 is capable and stores it within memory 42 (S902).

The received indication 31, together with the indication 33 of the video processing algorithms of which device 14 is capable, collectively indicate a totality of available video processing algorithms that could be performed in order to achieve the desired video processing. The term "desired video processing" may refer to video processing that is deemed to be necessary by such factors as the characteristics of the video data (e.g. format, frame rate, or the presence of noise or compression artifacts within the video data), characteristics of device(s) 12 and/or 14 (e.g. the resolution or refresh rate of the display), user preference settings specifying desired video image characteristics (e.g. acceptable noise level, contrast or color settings), or combinations of these. Thereafter, the logic 37 at video sink device 14 (FIG. 5) identifies a set of video processing algorithms of this totality for achieving the desired video processing (S904) and classifies the set of video processing algorithms into two subsets: a first subset for performance by the video source device 12 and a second subset for performance by the video sink device 14 (S905). This classification is performed based on the currently operative video processing apportionment criteria set by the user via GUI 1000 of FIG. 10, which, based on the user's selection of radio button 1004 in the present example, specifies maximum image quality as the sole video processing apportionment criterion. Accordingly, the logic 37 selects video processing algorithms that will result in the quality of the resultant video images being maximized, regardless of which device 12 or 14 is capable of performing that algorithm. More specifically, if the desired video processing dictates that each category of video processing identified in indications 31 and 33 of FIGS. 6 and 7 should be applied, then for each category of video processing, the logic 37 compares the algorithms in that category that are available at device 12 and/or device 14 in terms of the quality of the images that would result, and the video processing algorithm that is capable of generating the highest-quality result is selected in each category. If both devices 12 and 14 are capable of performing the chosen algorithm, then considerations such as load balancing (even if not expressly chosen as an apportionment criterion in GUI 1000) may be taken into consideration in selecting which of the two devices 12 or 14 is to perform that algorithm. Otherwise, performance of the algorithm is earmarked for whichever of the two devices is capable of it. Apportionment may be influenced by a logical "order of operations" for performing certain video processing algorithms or categories. For example, it is generally true that de-interlacing should be performed before, or at least "at the same time as", scaling (not after). Similarly, it is generally desirable to perform noise reduction before detail enhancement.

For example, assuming that the various de-interlacing algorithms identified in the table FIGS. 6 and 7 (i.e. scan line duplication, field merging, scan line interpolation, motion adaptive de-interlacing, and motion compensated de-interlacing) are ordered in ascending order by the relative quality of the de-interlaced video that results from their execution, then the operation S904 may determine that the GSS 26 should deactivate its scan line duplication (the only form of de-interlacing of which it is capable) in favour of activation by the television 14 of motion compensated de-interlacing.

It is noted that, when conservation of power at battery-powered devices is elected (by selection of radio buttons 1006 and 1014 of FIG. 10), if both devices 12 and 14 are found to be battery powered, operation S904 may involve identifying which of the two devices 12 and 14 is capable of processing the video with the least amount of power being consumed. A minimum threshold of video processing for video images of an acceptable quality may be need to be met. This minimum threshold of video processing could be hard-coded within the apportionment logic 37 or may be based on user preferences pertaining to video (e.g. as described above).

In some embodiments, video processing apportionment logic 37 may be configurable to take into account multiple apportionment criteria, such as providing maximum video image quality with the lowest possible power consumption. If a GUI is used to specify the operative criteria in this case, the GUI may utilize user interface controls (widgets) other than radio buttons, such as checkboxes for example, whose selection is not mutually exclusive.

It should be appreciated that the video processing apportionment logic 37 may incorporate dependencies between video processing algorithms in different categories. That is, the logic 37 may reflect the fact that the activation/deactivation of one video processing algorithm bears upon whether another video processing algorithm may or may not be activated in a different category of video processing. For example, if a form of de-interlacing is to be performed that necessarily involves scaling, then the logic 37 may automatically recognize that scaling should also be activated, and that it is desirable to perform scaling before, or at the same time as, the de-interlacing.

Once the subset of the video processing algorithms that is to be performed by the video source device 12 (the "slave") has been identified, the master device 14 generates one or more commands 19 for causing the slave device 12 to effect the video processing algorithm(s) earmarked for the slave. The command(s) 19 is/are then sent to the device 12 via cable 16 for implementation (S906). Communication of the command(s) may be by way of an auxiliary or "side" channel of interconnection 16 that is distinct from a channel carrying video data in the downstream direction. In the present embodiment, the command(s) is/are sent over the DDC channel to the video source device 12. Because the video source device 12 is conventionally the "master" of the DDC channel, such that the video sink device 14 would not be expected to initiate communication over the DDC channel, the sending of command(s) 19 may initially require the video sink device 14 to simulate a hot plug detect event. As is known in the art, a hot plug detect event is conventionally used to communicate to a video source device 12 (typically a CPU box) that a display device has been dynamically plugged in or unplugged therefrom. By simulating such an event, the video source device 12 can be caused to "retrieve" the command, e.g. as part of an Extended Display Identification Data (EDID) data structure. As is known in the art, the VESA Enhanced Extended Display Identification Data (E-EDID) Standard, Release A, 2.0 (September, 2006), defines a 128-byte data structure (which may be referred to as the "EDID 1.4" data structure) containing information which permits a modern computer to know what kind of monitor is connected to it, including vendor information, maximum image size, color characteristics, factory pre-set timings, frequency range limits, and character strings for the monitor name and serial number. The command(s) 19 could be defined as part of that data structure or within an extension block to that data structure. In alternative embodiments, such hot plug detect event simulation may be unnecessary. For example, some embodiments may employ the CEC channel for communicating the command(s) 19 to device 12. Because the CEC protocol permits multiple masters to co-exist on a single CEC channel, it would be possible for the video sink device 14 to initiate the communication of command(s) 19 to device 12. The CEC channel could even be used in conjunction with the DDC channel for the purpose of communicating commands. For example, a CEC command instructing the video source device 12 to "read command(s) 19 from the video sink device 14 over the DDC channel" may be sent by the video sink device 14. In the case where the interconnection 16 is governed by the DisplayPort® interface rather than HDMI™, the video sink device 14 could initiate the communication of the command(s) 19 by sending an interrupt signal to the video source device 12, upon which the device 12 may access the command(s) from device 14 over the DisplayPort® Auxiliary Channel by way of the interrupt vector register. Various mechanisms for communicating the commands(s) 19, as well as metadata (described below), between the devices 12 and 14 are possible.

The format or structure of the command(s) 19 may be programmed at each device 12 and 14. Various command formats could be employed. In one example, a binary command could be sent to device 12 containing a single bit for each video processing algorithm of which the device is capable. A bit value of "1" indicates that the video processing algorithm is to be activated while a bit value of "0" indicates that the video processing algorithm is to be deactivated. It may be desired to expressly communicate to the video source device 12 that the video processing algorithms of the second subset (i.e. those earmarked for downstream device 14) should be deactivated at device 12, to avoid any ambiguity at device 12 as to whether those video processing algorithms can remain activated if already active at device 12. In another exemplary command format, the command(s) 19 could comprise a variable length list containing, for each video processing algorithm, an identifier of that algorithm (e.g. 7 bits of a byte) and a desired state for that algorithm (e.g. last bit of byte="1" to activate the algorithm or "0" to deactivate the algorithm). There may be an understanding between the devices that any video processing algorithms not expressly referenced in command(s) 19 are "don't cares" from the perspective of device 14, i.e. can be left activated if they are already active or left off if they are currently inactive. If the subset of video processing algorithms earmarked for the video source device 12 is empty, then it may still be desired (although not necessarily required in all embodiments) to send command(s) 19 to ensure that these video processing algorithms are deactivated at device 12.

The master device also configures itself to perform the second subset of video processing algorithms (S907). To the extent that the second subset of video processing algorithms is the empty set (e.g. if all the video processing algorithms to be activated have been earmarked for the other device), then this configuration may be unnecessary.

Referring again to FIG. 8, upon receipt of the command(s) 19 at the video source device 12 (S804), the device 12 parses the command(s) to identify the video processing algorithm(s) to be effected. The identified algorithm(s) are then effected at the device 12 (S806), specifically, at GPU 30 (FIG. 4).

Thereafter, the video source device 12 of the present embodiment generates metadata indicative of the video processing algorithms that has been performed (S808). The generated metadata is then communicated over the interconnection 16 to the video sink device 14 to confirm implementation of the command(s) (S810). The format of the metadata may for example be any of: binary or textual; packetized; markup language; or compliant with ITU Recommendation ITU-BT.1364-1. The metadata may be communicated along with the video data over the interconnection 16. If the same channel is used, the metadata may be multiplexed with the video data, e.g. occupying unused portions of the video data stream (e.g. vertical blank or horizontal blank intervals). If multiple channels are used, the metadata may be carried over an auxiliary channel that is distinct from a primary channel over which video data is transmitted. Operation S808, S810 may continue for some time.

Referring again to FIG. 9, the metadata is received at video sink device 14 (S908) and is used to confirm whether the previously transmitted command(s) 19 did in fact result in performance of the video processing algorithms of the first subset at the video source device 12. If the metadata indicates that the any of the video processing algorithms of the first subset was not effected by device 12, the video sink device 14 may take remedial steps, such as adjusting its own video processing to effect the non-effected algorithm (S910) or possibly re-sending the command(s) 19, if it is considered that they may not have reached the video source device 12.

Conversely, if the metadata indicates that the any of the video processing algorithms that device 12 was expressly instructed to deactivate remain active (e.g. due to a manual activation of the video processing algorithm by a user of device 12), then the video sink device 14 may take remedial steps, such as adjusting its own video processing to cease performing that algorithm (to avoid needless duplication of effort) (S910) or, again, possibly re-sending the command(s) 19, if it is considered that they may not have reached the video source device 12.

As will be appreciated by those skilled in the art, modifications to the above-described embodiment can be made without departing from the essence of the invention. For example, the video source device 12 need not be a CPU box of a PC, but instead may be a DVD player, HD DVD player, Blu-ray disc player, an intermediate video processor, or set-top box (possibly with digital video recording capabilities) for example, or other source of video data. Moreover, the video sink device 14 may be something other than an LCD television, such as another type of television, a monitor or an intermediate video processor for example.

The video processing categories and video processing algorithms identified in indications 31 and 33 of FIGS. 6 and 7 may differ in other embodiments.

In another alternative, indications of video processing capabilities 31 and 33 could include information that is utilized by the video processing apportionment logic 37 to assist in the apportionment determination. For example, a quality indicator could be provided for each video processing algorithm. The quality indicator may indicate the relative quality of algorithm, e.g. on an absolute scale of, say, 0 to 100, where 0 indicates very poor quality (or an inability to perform the relevant algorithm) and 100 indicates very high quality. The scale may be a standardized scale, e.g. set by a standards body based on an assessment of the video processing capabilities of comparable, commercially available devices. The use of a standardized scale may promote ready comparison of video processing capabilities between devices. In another example, the indications 31, 33 of video processing capabilities may include an indicator of relative power consumption for each video processing algorithm, for use when power conservation is an operative apportionment criterion. These indicators too may conform to a standardized scale, to facilitate comparison of the anticipated power consumption resulting from video processing at each device.

It is not necessary for the video processing apportionment logic 37 to be dynamically configurable through a graphical user interface such as GUI 1000 (FIG. 10). In some embodiments, the logic 37 may be predetermined. Even if predetermined, the logic 37 may take into account such factors as the characteristics of the video data, characteristics of device(s) 12 and/or 14, user preference settings specifying desired video image characteristics, or combinations of these, as noted above, in determining an apportionment for video processing.

It is also noted that operation S808, S810 (FIG. 8) and operation S908, S910 (FIG. 9) may not occur in some embodiments. In such embodiments, the video sink device 14 may not be able to confirm that its commands have been effected by the video source device 12 unless it is able to analyze the video data images for evidence that the video processing has been applied for example.

As noted above, the role of the devices 12 and 14 in terms of video processing apportionment could be reversed. That is, the device 12 may act as the master and the device 14 as the slave. Such an embodiment is illustrated in FIG. 11.

Figure 11:
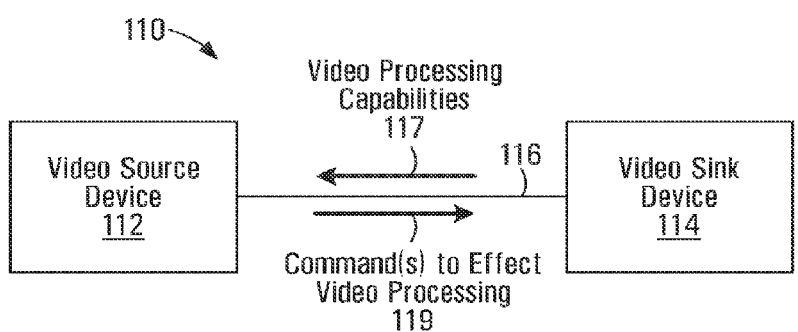
FIG. 11 is a schematic diagram of an alternative embodiment of the system of FIG. 1.

As shown in FIG. 11, system 110 includes a video source device 112 and a video sink device 114 interconnected by a video data interconnection 116. In this embodiment, the video source device 112 performs operation 900 of FIG. 9 while video sink device 114 performs operation 800 of FIG. 8, with the exception that each reference to "video source device" in FIGS. 8 and 9 should be replaced with "video sink device", and vice-versa. Accordingly, the device 114 communicates an indication of its video processing capabilities to the device 112 (rather than the reverse), as represented by way of arrow 117, while commands 119 are sent in the opposite direction. The DDC or CEC channel could be used to communicate the commands between the devices 112 and 114. The GUI 1000, if effected, would be effected by the video source device 112 rather than the video sink device 114. Moreover, any metadata that is communicated by the slave device would be communicated "upstream" from the video sink device 14 to the video source device 12.

In some embodiments, the indications 31, 33 of video processing capabilities may reflect user configuration of the relevant device 12, 14 (respectively). For example, if the user of device 12 has manually turned off all interlacing algorithms at device 12, then the indication 31 may reflect the fact that the device 12 presently has no interlacing capability. If the user later activates one or more interlacing algorithms, a revised indication 31 could be sent which reflects the fact that interlacing algorithms are now available.

In some embodiments, a separate indication 31, 33 may be provided for each type of video stream that the interconnection 16 may carry. For example, a separate indication 31, 33 may exist for each of video modes 480i, 480p, 720p, 1080i and 1080p.

It will further be appreciated that, in some embodiments, each of the video source device and video sink device may comprise a circuit. The circuit may for example be a standalone integrated circuit, or may form part of a larger integrated circuit, or may be subsumed within one or more electronic devices. The circuit may be fabricated using fabrication equipment, such as the type of equipment found in a semiconductor fabrication plant or foundry for example. The equipment may generate circuits based on a set of instructions comprising hardware description language that describes the circuit. The fabrication equipment processes the instructions and, based on that processing, creates the circuit. This approach may be used to fabricate a circuit representative of a video source device or a circuit representative of a video sink device (or both).

Figure 12:
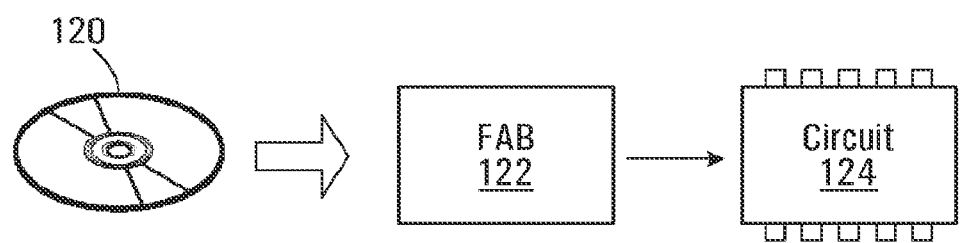
FIG. 12 is a simplified schematic diagram of the fabrication of a circuit comprising a video source device or video sink device.

This approach is schematically illustrated in FIG. 12. Exemplary hardware description language instructions stored on a machine-readable medium 120 are processed by exemplary fabrication equipment 122, which creates an exemplary circuit 124 based on the processed instructions. The exemplary instructions may for example be in a hardware description language, such as Very High Speed Integrated Circuit Hardware Description Language (VHDL), Verilog, or Verilog-A.

Other modifications will be apparent to those skilled in the art and, therefore, the invention is defined in the claims.

What is claimed is:

1. A method of apportioning desired video processing between a video source device and a video sink device, the method comprising, at said video source device:
based upon an indication of video processing algorithms of which said video sink device is capable and an indication of video processing algorithms of which said video source device is capable:
identifying a set of video processing algorithms for achieving desired video processing; and
classifying the video processing algorithms of said set into a first subset of video processing algorithms for performance by said video sink device and a second subset of video processing algorithms for performance by said video source device; and
sending at least one command to said video sink device, said at least one command identifying the first subset of video processing algorithms to be effected at said video sink device.

2. The method of claim 1 further comprising configuring said video source device to effect the second subset of video processing algorithms.

3. The method of claim 1 further comprising receiving at said video source device said indication of video processing algorithms of which said video sink device is capable.

4. The method of claim 3 wherein the indication of video processing algorithms is associated with a video mode.

5. The method of claim 4 wherein the video mode comprises one of 480i, 480p, 720p, 1080i and 1080p.

6. The method of claim 4 wherein the video mode is a first video mode and further comprising receiving at said video source device an other indication of video processing algorithms of which said video sink device is capable, the other indication being associated with a second video mode.

7. The method of claim 1 wherein said classifying is performed in accordance with one or more video processing apportionment criteria.

8. The method of claim 7 further comprising: presenting a user interface comprising at least one user interface control for specifying said one or more video processing apportionment criteria.

9. The method of claim 7 wherein said video processing apportionment criteria comprise at least one of maximizing the quality of video images and conserving power at either or both of said video source device and video sink device.

10. The method of claim 7 wherein said video processing apportionment criteria comprise balancing a load associated with the desired video processing between said video source device and said video sink device.

11. The method of claim 1 further comprising, subsequent to said sending, receiving metadata indicative of whether said video sink device has effected the first subset of video processing algorithms.

12. The method of claim 11 further comprising:
if said metadata indicates that any video processing algorithm of the first subset has not been effected by said video sink device, configuring said video source device to perform said video processing algorithm.

13. The method of claim 11 further comprising:
if said metadata indicates that any video processing algorithm of the second subset has been effected by said video sink device, configuring said video source device to refrain from performing said video processing algorithm.

14. The method of claim 1 wherein said sending comprises transmitting said at least one command over an auxiliary channel of an interconnection between the video source device and video sink device, said channel being auxiliary to a primary channel of said interconnection for communicating a video signal from said video source device to said video sink device.

15. The method of claim 14 wherein said interconnection is a High-Definition Multimedia Interface (HDMI) interconnection and said auxiliary channel is a Display Data Channel or a Consumer Electronics Command channel.

16. The method of claim 1 wherein said receiving an indication comprises receiving the indication over an auxiliary channel of an interconnection between said video source device and said video sink device, said channel being auxiliary to a primary channel of said interconnection for communicating a video signal from said video source device to said video sink device.

17. The method of claim 1 wherein said at least one command identifies the video processing algorithms of said second subset for deactivation at said video sink device.

18. A non-transitory machine readable medium storing instructions that, when executed by a processor of a video source device, cause said video source device to:
   based upon an indication of video processing algorithms of which a video sink device is capable and an indication of video processing algorithms of which said video source device is capable:
      identify a set of video processing algorithms for achieving desired video processing; and
      classify the video processing algorithms of said set into a first subset of video processing algorithms for performance by said
      video sink device and a second subset of video processing algorithms for performance by said video source device; and
   send at least one command to said video sink device, said at least one command identifying the first subset of video processing algorithms to be effected at said video sink device.

19. The machine readable medium of claim 18 wherein said instructions further configure said video source device to effect the second subset of video processing algorithms.

20. A video source device comprising a processor and memory interconnected with said processor, said memory storing instructions which, when executed by said processor, cause said video source device to:
   based upon an indication of video processing algorithms of which a video sink device is capable and an indication of video processing algorithms of which said video source device is capable:
      identify a set of video processing algorithms for achieving desired video processing; and
      classify the video processing algorithms of said set into a first subset of video processing algorithms for performance by said video sink device and a second subset of video processing algorithms for performance by said video source device; and
   send at least one command to said video sink device, said at least one command identifying the first subset of video processing algorithms to be effected at said video sink device.

21. The video source device of claim 20 wherein said instructions further configure said video source device to effect the second subset of video processing algorithms.

22. A non-transitory machine-readable medium storing instructions that, when processed, cause the creation of a circuit capable of:
   based upon an indication of video processing algorithms of which a video sink device is capable and an indication of video processing algorithms of which a video source device is capable:
      identifying a set of video processing algorithms for achieving desired video processing; and
      classifying the video processing algorithms of said set into a first subset of video processing algorithms for performance by said video sink device and a second subset of video processing algorithms for performance by said video source device; and
   sending at least one command to said video sink device, said at least one command identifying the first subset of video processing algorithms to be effected at said video sink,
   wherein said circuit comprises said video source device.

23. The machine-readable medium of claim 22 wherein said instructions comprise hardware description language instructions.

24. The machine-readable medium of claim 23 wherein said hardware description language is one of Verilog hardware description language, Verilog-A hardware description language, and Very High Speed Integrated Circuit Hardware Description Language (VHDL).

* * * * *